US008810566B2

(12) United States Patent
 Nixon

(10) Patent No.: US 8,810,566 B2
(45) Date of Patent: Aug. 19, 2014

(54) PROVIDING A NAVIGATION MESH BY WHICH OBJECTS OF VARYING SIZES CAN TRAVERSE A VIRTUAL SPACE

(75) Inventor: Travis Nixon, Centerville, UT (US)

(73) Assignee: Disney Enterprises, Inc., Burbank, CA (US)

(*) Notice: Subject to any disclaimer, the term of this patent is extended or adjusted under 35 U.S.C. 154(b) by 551 days.

(21) Appl. No.: 13/183,881

(22) Filed: Jul. 15, 2011

(65) Prior Publication Data

US 2013/0016090 A1    Jan. 17, 2013

(51) Int. Cl.
  *G06T 15/00*   (2011.01)
  *G06T 19/00*   (2011.01)
  *G06T 17/20*   (2006.01)

(52) U.S. Cl.
  CPC .............. *G06T 17/20* (2013.01); *G06T 19/003* (2013.01)
  USPC ......................................................... 345/419

(58) Field of Classification Search
  CPC ......... G06T 17/20; G06T 17/00; G06T 17/05; G06T 9/20
  USPC ......................................................... 345/419
  See application file for complete search history.

(56) References Cited

U.S. PATENT DOCUMENTS

2009/0150790 A1* 6/2009 Wilhelm .................... 715/737

OTHER PUBLICATIONS

Marcelo Kallmann, Shortest Paths with Arbitrary Clearance from Navigation Meshes, Eurographics/ACM SIGGRAPH Symposium on Computer Animation (2010), pp. 159-168, 233.*

* cited by examiner

*Primary Examiner* — Kee M Tung
*Assistant Examiner* — Haixia Du
(74) *Attorney, Agent, or Firm* — Pillsbury Winthrop Shaw Pittman LLP

(57) ABSTRACT

A single polygonal navigation mesh in a virtual space by which objects of varying sizes can traverse may be provided. This may allow the navigation mesh to be used in determining appropriate paths for objects having a wide range of object sizes. The objects may include objects having a continuous range of possible object sizes. The use of a single navigation mesh for a range of object sizes may reduce the amount of storage needed to store separate navigation meshes for different object sizes. According to some implementations, constraints at outer boundaries of the navigation mesh may be determined based on a given object size allowing a single navigation mesh to be used for objects of any size.

14 Claims, 6 Drawing Sheets

PROVIDING A NAVIGATION MESH BY WHICH OBJECTS OF VARYING SIZES CAN TRAVERSE A VIRTUAL SPACE

FIELD OF THE DISCLOSURE

This disclosure relates to constraining movement of objects through a virtual space using a single polygonal navigation mesh for objects of varying sizes, rather than using meshes that are object size-specific.

BACKGROUND

Generally, navigation meshes may be used to define where objects can move and/or be located within a virtual space. Such navigation meshes may be constructed from polygonal tiles joined at their edges, and can be two- or three-dimensional. Conventional navigation meshes may not be visible within the virtual space. That is, a navigation mesh may be separate and unique from meshes that define visible surfaces within the virtual space. In some cases, however, a navigation mesh may track or correspond to a portion of a mesh that defines visible surfaces within the virtual space.

Traditionally, separate navigation meshes may be predefined for each one of a set of discrete object sizes. As a result, a virtual space may only accommodate objects of discrete sizes and/or certain sized objects may be over restricted in the virtual space. For example, if a virtual space has two navigation meshes—one for objects of size 1 (e.g., an object radius and/or another measure equaling one length unit) and another for objects of size 5, then an object of size 2 may utilize the navigation mesh for object of size 5. Thus, even though an object of size 2 is smaller than an object of size 5 and should be able to traverse areas where the object of size 5 cannot, the object of size 2 may have the same positional restrictions as the object of size 5. Additionally, memory usage associated with storing several predefined navigation meshes may be a drawback of existing approaches to navigation meshes.

SUMMARY

One aspect of the disclosure relates to a system and method for providing a single polygonal navigation mesh in a virtual space by which objects of varying sizes can traverse. This may allow the navigation mesh to be used in determining appropriate paths for objects having a wide range of object sizes. The objects may include objects having a continuous range of possible object sizes. The use of a single navigation mesh for a range of object sizes may reduce the amount of storage needed to store separate navigation meshes for different object sizes. According to some implementations, constraints at outer boundaries of the navigation mesh may be determined based on a given object size allowing a single navigation mesh to be used for objects of any size.

The system may include a virtual space platform. The virtual space platform may be configured to communicate with one or more other computing platforms via any one of a number of communication channels. The virtual space platform may be configured to execute one or more computer program modules. The computer program modules may include one or more of a space module, a navigation mesh module, a constraint initialization module, a constraint validation module, a split constraint module, a mesh traversal module, and/or other modules.

The space module may be configured to provide one or more virtual spaces to users via the virtual space platform and/or one or more other computing platforms. As used herein, a "virtual space" may include one or more of a virtual space, a video game, a virtual world, and/or other virtual spaces.

The navigation mesh module may be configured to provide a navigation mesh associated with the virtual space. The navigation mesh may correspond to a surface on which an object travels in the virtual space. The navigation mesh may be formed from polygonal tiles. Adjacent ones of the polygonal tiles may be joined along adjacent polygonal tile edges. Outer boundaries of the navigation mesh may confine paths by which the objects can traverse a surface or volumetric region in the virtual space such that the objects cannot breach an outer boundary of the navigation mesh. Portions of a surface in the virtual space may be planar and/or non-planar. A volumetric region in the virtual space may include a three-dimensional space in the virtual space. A navigation mesh corresponding to a given volumetric region may include a surface mesh that encompasses some or all of the volumetric region.

According to some implementations, a navigation mesh provided by the navigation mesh module may include a volumetric navigation mesh. A volumetric navigation mesh may include one or more volumetric units. A volumetric unit may be a closed shape defined by a plurality of polygonal tiles. The polygonal tiles forming a given volumetric unit may be planar and/or non-planar polygonal tiles. In a volumetric navigation mesh, the one or more volumetric units may be joined at the faces (i.e., polygonal tiles) of the volumetric units. The outer boundary of a volumetric navigation mesh may include a plurality of polygonal tiles. The outer boundary of a volumetric navigation mesh may establish a volumetric region within which positions and/or movements of objects are confined. As such, object positions and/or movements may be confined in three dimensions, in accordance with some implementations.

The constraint initialization module may be configured to determine constraints associated with the navigation mesh. Such a determination may be made based on a given object size. Constraints may be located within the outer boundaries of the navigation mesh. Constraints may be configured to confine a position of a center of a given object (or other point associated with the given object) having the given object size to prevent the given object from breaching the outer boundary of the navigation mesh.

According to various implementations, an object having either two spatial dimensions in the virtual space or an object that is restricted by a navigation mesh in two-dimensions may be represented or modeled as a circle. Such a circle may have an object radius defining the associated object size. An object having three spatial dimensions in the virtual space or an object that is restricted by a navigation mesh in three dimensions may be represented or modeled as a cylinder. Such a cylinder may have an object radius defining the associated object size.

Constraints determined by the system may include one or both of one or more edge constraints or one or more corner constraints. An edge constraint may correspond to an individual polygonal tile edge that forms at least a portion of the outer boundary of the navigation mesh. An edge constraint may define a line parallel to the corresponding polygonal tile edge. That line may be spaced a distance equal to the object radius associated with the given object from the corresponding polygonal tile edge. A corner constraint may correspond to individual corners of the outer boundary of the navigation mesh having an internal angle greater than 180 degrees. A corner constraint may define an arc centered at a corresponding corner. That arc may have a corner constraint radius equal to the object radius associated with the given object.

In implementations where a volumetric navigation mesh is utilized, constraints determined by the constraint initialization module may include surface constraints that correspond to the outer boundary of the volumetric navigation mesh. A surface constraint corresponding to a polygonal tile of the outer boundary may include a planar and/or non-planar shape. In some implementations, points on such a surface constraint may be equidistant from a corresponding polygonal tile of the volumetric navigation mesh. A surface constraint corresponding to an internal corner having internal angles greater than 180 degrees may include a spherical shape centered at the internal corner. The distance between a surface constraint and corresponding outer boundary of the volumetric navigation mesh may be based on a given object size.

The constraint validation module may be configured to validate individual ones of the constraints. This validation may include determining whether one or more constraints adjacent to a given constraint completely encompass an area of influence associated with the given constraint. An area of influence associated with a constraint may include the area on the navigation mesh between the constraint and a corresponding outer boundary of the navigation mesh. Invalidated constraints may be excluded as constraints associated with a corresponding object size.

The split constraint module may be configured to determine one or more new constraints associated with a choke point in the navigation mesh. A choke point may be a region of the navigation mesh that is narrower than adjacent regions of the navigation mesh. According to some implementations, individual ones of the new constraints may be or may be equivalent to portions of one or more preexisting constraints. The split constraint module may be further configured to determine a largest object size that can traverse through the choke point.

The mesh traversal module may be configured to determine whether a given object can traverse from a first polygonal tile of the navigation mesh to a second polygonal tile of the navigation mesh based on the constraints. Such a determination may include determining whether there are any valid positions for the given object in the second polygonal tile. In some implementations, the mesh traversal module may be configured to determine, when an object enters the navigation mesh, the nearest valid point on the navigation mesh to a starting location of the object and/or the nearest valid point on the navigation mesh to a desired target location of the object. In general, to traverse the navigation mesh, the object must cross shared interior polygonal tile edges between polygonal tiles. As such, the mesh traversal module may be configured to determine whether crossing a particular interior polygonal edge is allowed for a given object size.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
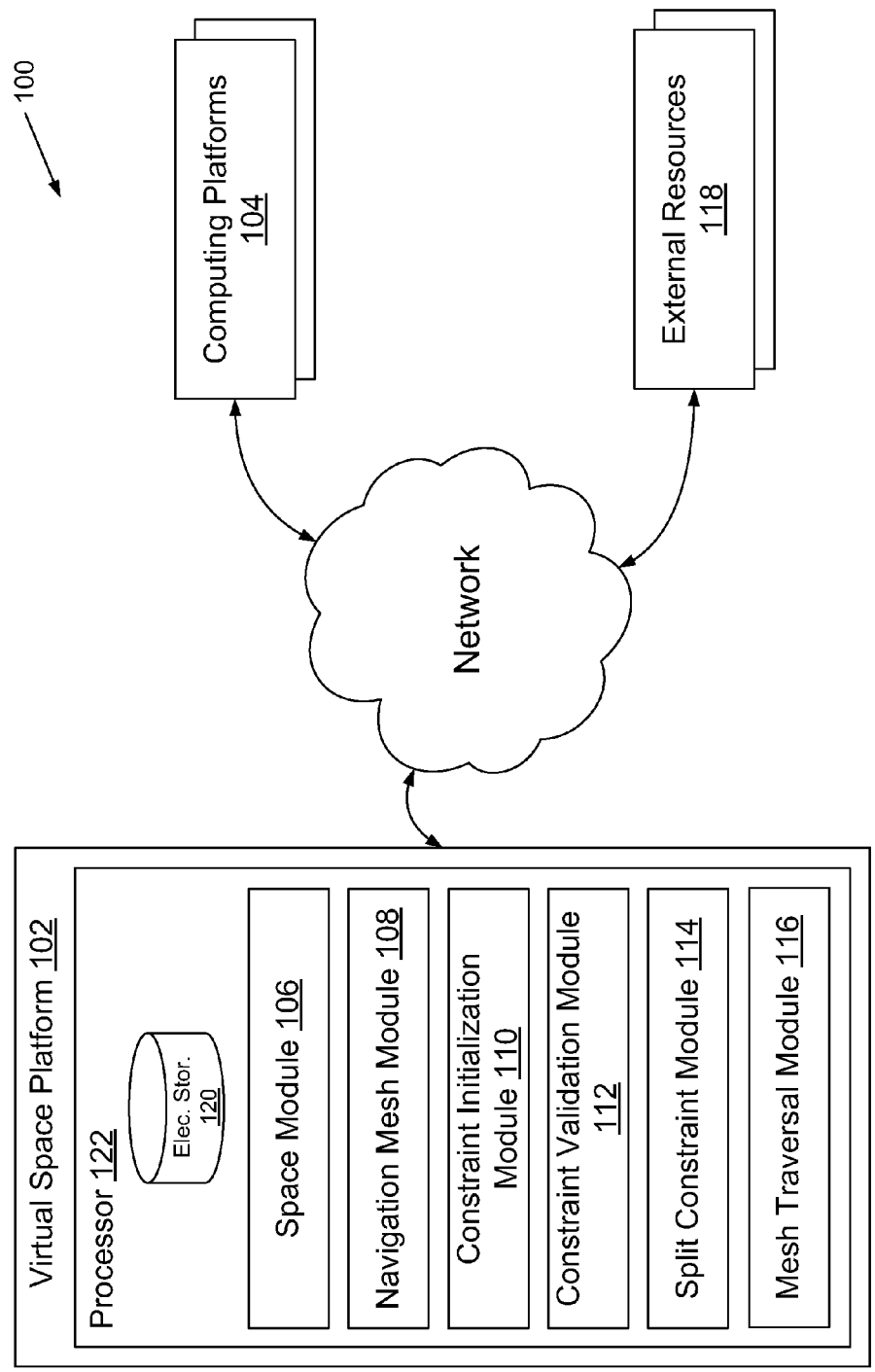
FIG. 1 illustrates a system configured for providing a single polygonal navigation mesh in a virtual space by which objects of varying sizes can traverse, in accordance with one or more implementations.

FIG. 1 illustrates a system 100 configured for providing a single polygonal navigation mesh in a virtual space by which objects of varying sizes can traverse, in accordance with one or more implementations. The virtual space may be provided by a local platform and/or by a remote platform over a network. In some implementations, system 100 may include a virtual space platform 102. The virtual space platform 102 may be configured to communicate with one or more other computing platforms 104. Such communication may be according to a client/server architecture. According to various implementations, users may access system 100 and/or the virtual space via virtual space platform 102 and/or computing platforms 104.

The virtual space platform 102 may be configured to execute one or more computer program modules. The computer program modules may include one or more of a space module 106, a navigation mesh module 108, a constraint initialization module 110, a constraint validation module 112, a split constraint module 114, a mesh traversal module 116, and/or other modules.

The space module 106 may be configured to provide one or more virtual spaces to users via virtual space platform 102 and/or computing platforms 104. As used herein, a "virtual space" may include one or more of a video game, a virtual world, and/or other virtual spaces.

A virtual space may comprise a simulated space that is accessible by users via local platforms (e.g., virtual space platform 102) and/or clients (e.g., computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 106 is not intended to be limiting. The space module 106 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through virtual space platform 102 and/or computing platforms 104. The users may interact with each other through communications exchanged within the virtual space. Such communications may include one or more of textual chat, instant messages, private messages, voice communications, and/or other communications. Communications may be received and entered by the users via virtual space platform 102 and/or computing platforms 104.

The navigation mesh module 108 may be configured to provide a navigation mesh associated with the virtual space. The navigation mesh may correspond to a surface on which an object travels in the virtual space. The navigation mesh may be formed from polygonal tiles. Adjacent ones of the polygonal tiles may be joined along adjacent polygonal tile edges. Outer boundaries of the navigation mesh may confine paths by which the objects can traverse a surface or volumetric region in the virtual space such that the objects cannot breach an outer boundary of the navigation mesh. Portions of a surface in the virtual space may be planar and/or non-planar. A volumetric region in the virtual space may include a three-dimensional space in the virtual space. A navigation mesh corresponding to a given volumetric region may include a surface mesh that encompasses some or all of the volumetric region.

Figure 2:
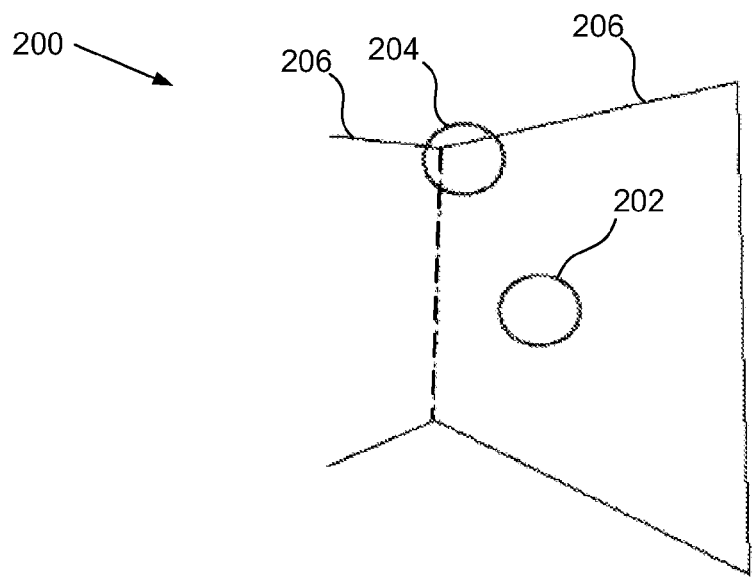
FIG. 2 illustrates valid and invalid object positions on a portion of a navigation mesh, in accordance with one or more implementations.

FIG. 2 illustrates valid and invalid object positions on a portion of a navigation mesh 200, in accordance with one or more implementations. Objects 202 and 204 may have respective object sizes associated therewith. In some implementations, objects 202 and 204 may be modeled or otherwise represented by circles in two dimensional configurations and/or cylinders in three dimensional configurations, as discussed further below. When determining whether a specific point in a navigation mesh is a valid position for an object to reside in or move through, the size of the object and/or other spatial measures (e.g., the object radius) may be taken into account. Any position that would result in overlap between the object and an outer boundary of the navigation mesh is invalid. An invalid position may be adjusted so that the object lies fully on the navigation mesh. In FIG. 2, the position of object 202 is valid, but the position of object 204 is invalid because object 204 breaches outer boundary 206 of navigation mesh 200.

According to some implementations, a navigation mesh provided by navigation mesh module 108 may include a volumetric navigation mesh. A volumetric navigation mesh may include one or more volumetric units. A volumetric unit may be a closed shape defined by a plurality of polygonal tiles. One example of a volumetric unit may be a cube formed by six polygonal tiles, however other shapes may be used as volumetric units. The polygonal tiles forming a given volumetric unit may be planar and/or non-planar polygonal tiles. By way of non-limiting example, a non-planar polygonal tile may include a convex shape and/or other non-planar shapes. In a volumetric navigation mesh, the one or more volumetric units may be joined at the faces (i.e., polygonal tiles) of the volumetric units. The outer boundary of a volumetric navigation mesh may include a plurality of polygonal tiles. The outer boundary of a volumetric navigation mesh may establish a volumetric region within which positions and/or movements of objects are confined. As such, object positions and/or movements may be confined in three dimensions, in accordance with some implementations.

The constraint initialization module 110 may be configured to determine constraints associated with the navigation mesh. Such a determination may be made based on a given object size. Constraints may be located within the outer boundaries of the navigation mesh. Constraints may be configured to confine a position of a center of a given object (or other point associated with the given object) having the given object size to prevent the given object from breaching the outer boundary of the navigation mesh.

Objects in the virtual space may be represented and/or modeled by any shape for purposes of the navigation mesh. According to various implementations, an object having either two spatial dimensions in the virtual space or an object that is restricted by a navigation mesh in two-dimensions may be represented or modeled as a circle. Such a circle may have an object radius defining the associated object size. An object having three spatial dimensions in the virtual space or an object that is restricted by a navigation mesh in three dimensions may be represented or modeled as a cylinder. Such a cylinder may have an object radius defining the associated object size.

Constraints determined in system 100 may include one or both of one or more edge constraints or one or more corner constraints. An edge constraint may correspond to an individual polygonal tile edge that forms at least a portion of the outer boundary of the navigation mesh. An edge constraint may define a line parallel to the corresponding polygonal tile edge. That line may be spaced a distance equal to the object radius associated with the given object from the corresponding polygonal tile edge. A corner constraint may correspond to individual corners of the outer boundary of the navigation mesh having an internal angle greater than 180 degrees. A corner constraint may define an arc centered at a corresponding corner. That arc may have a corner constraint radius equal to the object radius associated with the given object.

Figure 3:
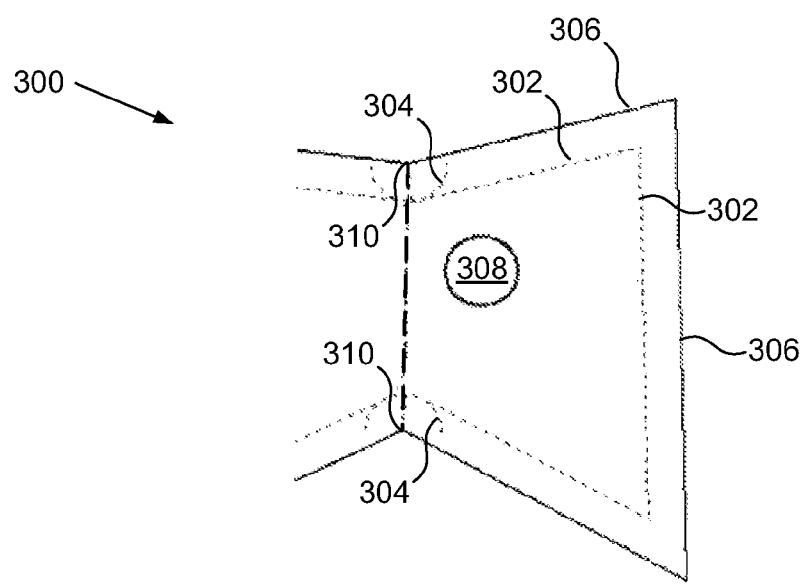
FIG. 3 illustrates constraints on a portion of a navigation mesh, in accordance with one or more implementations.

FIG. 3 illustrates constraints on a portion of a navigation mesh 300, in accordance with one or more implementations. The navigation mesh 300 may have edge constraints 302 and corner constraints 304. The edge constraints 302 may be parallel to corresponding outer boundaries 306 of navigation mesh 300. A given edge constraint 302 and a corresponding outer boundary 306 may be separated by a distance equal to the radius of object 308. The corner constraints 304 may be arcs centered at corners 310 of the navigation mesh 300. The corners 310 may have internal angles greater than 180 degrees. The arcs of corner constraints 304 may have a radius equal to the radius of object 308. The center position of object 308 may be constrained to the area within navigation mesh 300 defined by edge constraints 302 and corner constraints 304.

In implementations where a volumetric navigation mesh is utilized, constraints determined by constraint initialization module 110 may include surface constraints that correspond to the outer boundary of the volumetric navigation mesh. A surface constraint corresponding to a polygonal tile of the outer boundary may include a planar and/or non-planar shape. In some implementations, points on such a surface constraint may be equidistant from a corresponding polygonal tile of the volumetric navigation mesh. A surface constraint corresponding to an internal corner having internal angles greater than 180 degrees may include a spherical shape centered at the internal corner. The distance between a surface constraint and corresponding outer boundary of the volumetric navigation mesh may be based on a given object size.

The constraint validation module 112 may be configured to validate individual ones of the constraints. This validation may include determining whether one or more constraints adjacent to a given constraint completely encompass an area of influence associated with the given constraint. An area of influence associated with a constraint may include the area on the navigation mesh between the constraint and a corresponding outer boundary of the navigation mesh. Invalidated constraints may be excluded as constraints associated with a corresponding object size.

Figure 4:
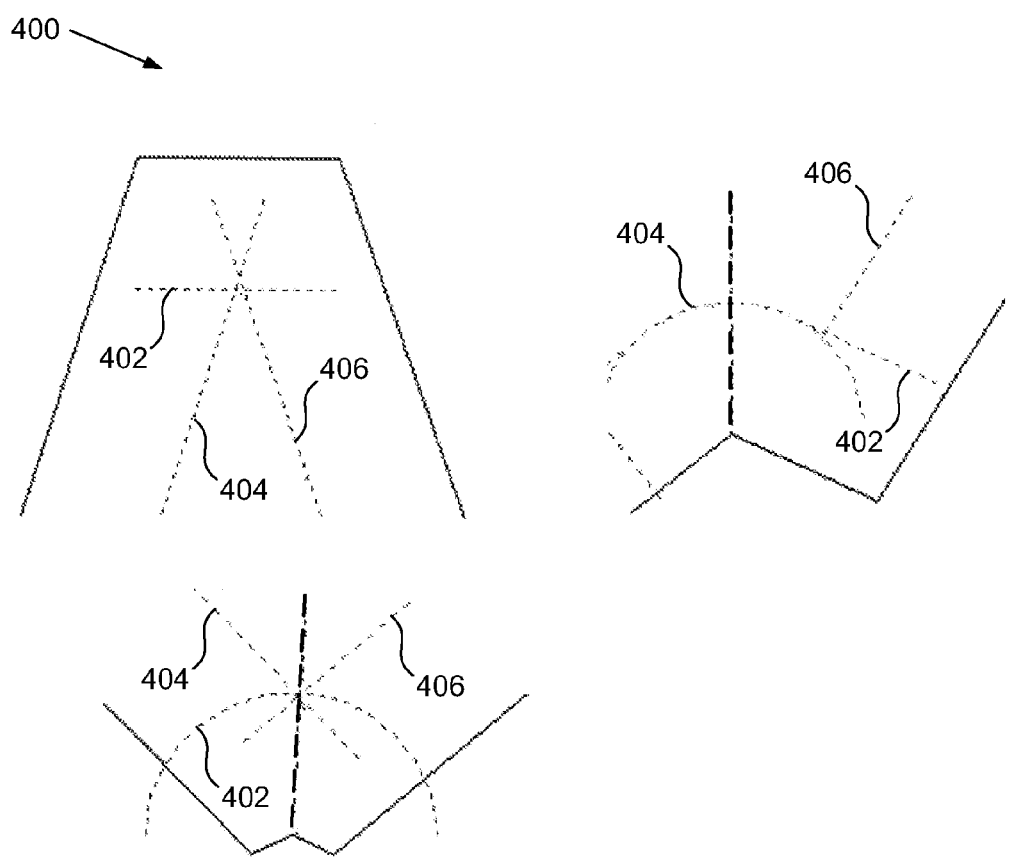
FIG. 4 illustrates invalidation of constraints on portions of a navigation mesh, in accordance with one or more implementations.

FIG. 4 illustrates invalidation of constraints on portions of a navigation mesh 400, in accordance with one or more implementations. As an object radius forming a basis of a set of constraints increases, it may be possible for some constraints to become invalid. As mentioned above, when an area of influence associated with a given constraint is completely encompassed by neighboring constraints, the given constraint may be invalidated. In FIG. 4, constraint 402 in each portion of navigation mesh 400 may become invalidated by constraints 404 and 406 if a corresponding object radius increases because areas of influence of constraint 404 and 406 will completely encompass that of constraint 402.

The split constraint module 114 may be configured to determine one or more new constraints associated with a choke point in the navigation mesh. A choke point may be a region of the navigation mesh that is narrower than adjacent regions of the navigation mesh. According to some implementations, individual ones of the new constraints may be or may be equivalent to portions of one or more preexisting constraints. The split constraint module 114 may be further configured to determine a largest object size that can traverse through the choke point.

Figure 5:
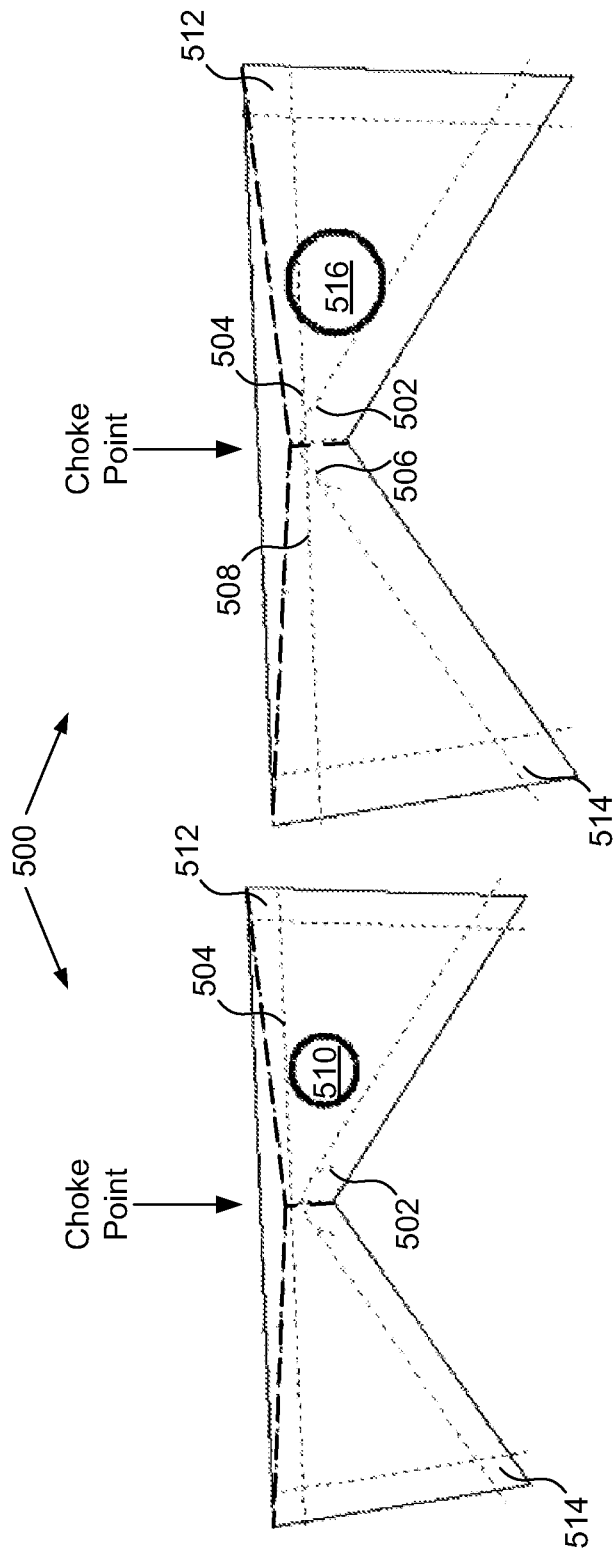
FIG. 5 illustrates new constraints determined at a choke point of a navigation mesh, in accordance with one or more implementations.

FIG. 5 illustrates new constraints determined at a choke point of a navigation mesh 500, in accordance with one or more implementations. FIG. 5 shows constraints for two different object sizes on navigation mesh 500. According to some implementations, when constraint 502 touches constraint 504, new constraints 506 and 508 may be determined. Based on constraints 502 and 504, object 510 may travel between polygonal tiles 512 and 514. Based on constraints 502-508, object 516 may not travel from polygonal tile 512 to polygonal tile 514.

The mesh traversal module 116 may be configured to determine whether a given object can traverse from a first polygonal tile of the navigation mesh to a second polygonal tile of the navigation mesh based on the constraints. Such a determination may include determining whether there are any valid positions for the given object in the second polygonal tile. In some implementations, mesh traversal module 116 may be configured to determine, when an object enters the navigation mesh, the nearest valid point on the navigation mesh to a starting location of the object and/or the nearest valid point on the navigation mesh to a desired target location of the object. In general, to traverse the navigation mesh, the object must cross shared interior polygonal tile edges between polygonal tiles. As such, mesh traversal module 116 may be configured to determine whether crossing a particular interior polygonal edge is allowed for a given object size.

Figure 6A:
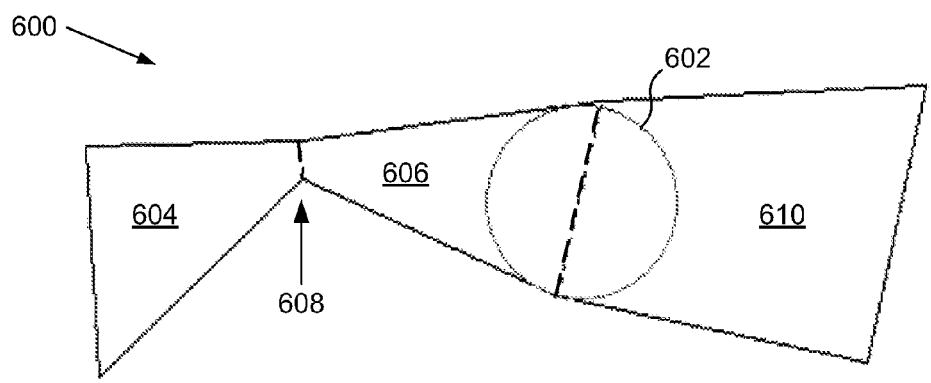
FIGS. 6A and 6B illustrate considerations when determining whether an object can traverse between polygonal tiles of a navigation mesh based on associated constraints, in accordance with one or more constraints.
Figure 6B:
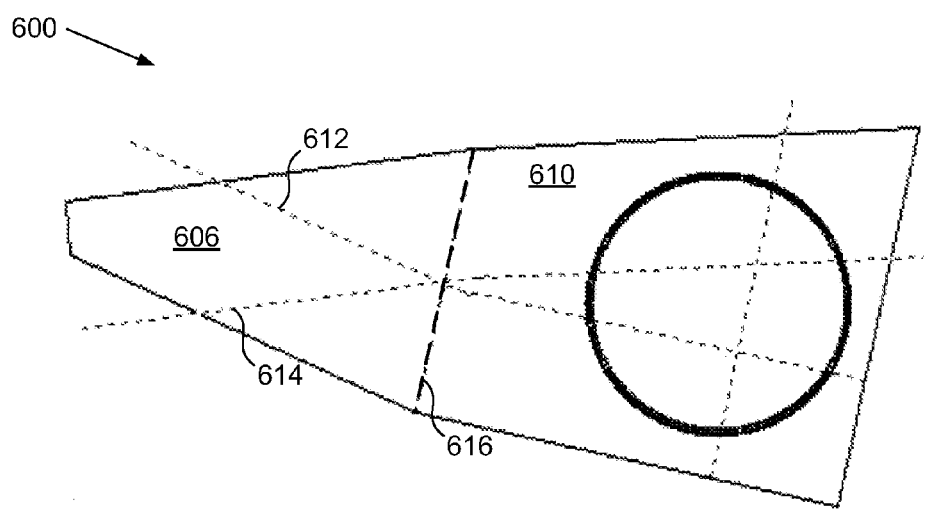

FIGS. 6A and 6B illustrate considerations when determining whether an object can traverse between polygonal tiles of a navigation mesh 600 based on associated constraints, in accordance with one or more constraints. Determining whether crossing a particular interior polygonal edge is allowed for a given object size may be based on choke points. In FIG. 6A, travel by object 602 between polygonal tiles 604 and 606 is restricted by choke point 608. The maximum object radius and/or object size that could possibly fit through choke point 608 may be determined. When determining a path for object 602, travel between polygonal tiles 604 and 606 may be allowed if the object radius and/or object size of object 602 is less than the determined maximum.

Determining whether crossing a particular interior polygonal edge is allowed for a given radius may include determining a largest object radius and/or object size that has any valid position in a given polygonal tile. In FIG. 6A, object 602 represents the largest object radius and/or object size that can be positioned in polygonal tile 606. Once that largest object radius and/or object size is determined, it may be used to determine if travel from one polygonal tile to another is valid. For example, if an object is in polygonal tile 610, but its object radius and/or object size is greater than that maximum for polygonal tile 606, then travel from polygonal tile 610 to polygonal tile 606 may not be allowed for that object. The maximum object radius and/or object size may be determined by identifying the object radius and/or object size for which the entire area of a given polygonal tile would be outside of the constraints of the navigation mesh. In FIG. 6B, that occurs when the intersection between constraints 612 and 614 cross the interior polygonal edge 616 separating polygonal tile 606 and polygonal tile 610.

In some implementations, virtual space platform 102, computing platforms 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which virtual space platform 102, computing platforms 104, and/or external resources 118 may be operatively linked via some other communication media.

A given computing platform 104 may include one or more processors configured to execute computer program modules. The computer program modules may be configured to enable an expert or user associated with the given computing platforms 104 to interface with virtual space platform 102 and/or external resources 118, and/or provide other functionality attributed herein to computing platforms 104. By way of non-limiting example, the given computing platform 104 may include one or more of a desktop computer, a laptop computer, a handheld computer, a NetBook, a Smartphone, a gaming console, and/or other computing platforms.

The external resources 118 may include sources of information, hosts and/or providers of virtual spaces outside of system 100, external entities participating with system 100, and/or other resources. In some implementations, some or all of the functionality attributed herein to external resources 100 may be provided by resources included in system 100.

The virtual space platform 102 may include electronic storage 120, one or more processors 122, and/or other components. The virtual space platform 102 may include communication lines, or ports to enable the exchange of information with a network and/or other computing platforms. Illustration of virtual space platform 102 in FIG. 1 is not intended to be limiting. The virtual space platform 102 may include a plurality of hardware, software, and/or firmware components operating together to provide the functionality attributed herein to virtual space platform 102. For example, virtual space platform 102 may include one or more servers and may be implemented by a cloud of computing platforms operating together as virtual space platform 102. Additionally, virtual space platform 102 may include one or more of a desktop computer, a laptop computer, a handheld computer, a NetBook, a Smartphone, a gaming console, and/or other computing platforms.

Electronic storage 120 may comprise electronic storage media that electronically stores information. The electronic storage media of electronic storage 120 may include one or both of system storage that is provided integrally (i.e., substantially non-removable) with virtual space platform 102 and/or removable storage that is removably connectable to virtual space platform 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor 122, information received from virtual space platform 102, information received from computing platforms 104, and/or other information that enables virtual space platform 102 to function as described herein.

Processor(s) 122 is configured to provide information processing capabilities in virtual space platform 102. As such, processor 122 may include one or more of a digital processor, an analog processor, a digital circuit designed to process information, an analog circuit designed to process information, a state machine, and/or other mechanisms for electronically processing information. Although processor 122 is shown in FIG. 1 as a single entity, this is for illustrative purposes only. In some implementations, processor 122 may include a plurality of processing units. These processing units may be physically located within the same device, or processor 122 may represent processing functionality of a plurality of devices operating in coordination. The processor 122 may be configured to execute modules 106, 108, 110, 112, 114, 116, and/or other modules. Processor 122 may be configured to execute modules 106, 108, 110, 112, 114, 116, and/or other modules by software; hardware; firmware; some combination of software, hardware, and/or firmware; and/or other mechanisms for configuring processing capabilities on processor 122.

It should be appreciated that although modules 106, 108, 110, 112, 114, and 116 are illustrated in FIG. 1 as being co-located within a single processing unit, in implementations in which processor 122 includes multiple processing units, one or more of modules 106, 108, 110, 112, 114, and/or 116 may be located remotely from the other modules. The description of the functionality provided by the different modules 106, 108, 110, 112, 114, and/or 116 described below is for illustrative purposes, and is not intended to be limiting, as any of modules 106, 108, 110, 112, 114, and/or 116 may provide more or less functionality than is described. For example, one or more of modules 106, 108, 110, 112, 114, and/or 116 may be eliminated, and some or all of its functionality may be provided by other ones of modules 106, 108, 110, 112, 114, and/or 116. As another example, processor 122 may be configured to execute one or more additional modules that may perform some or all of the functionality attributed below to one of modules 106, 108, 110, 112, 114, and/or 116.

Figure 7:
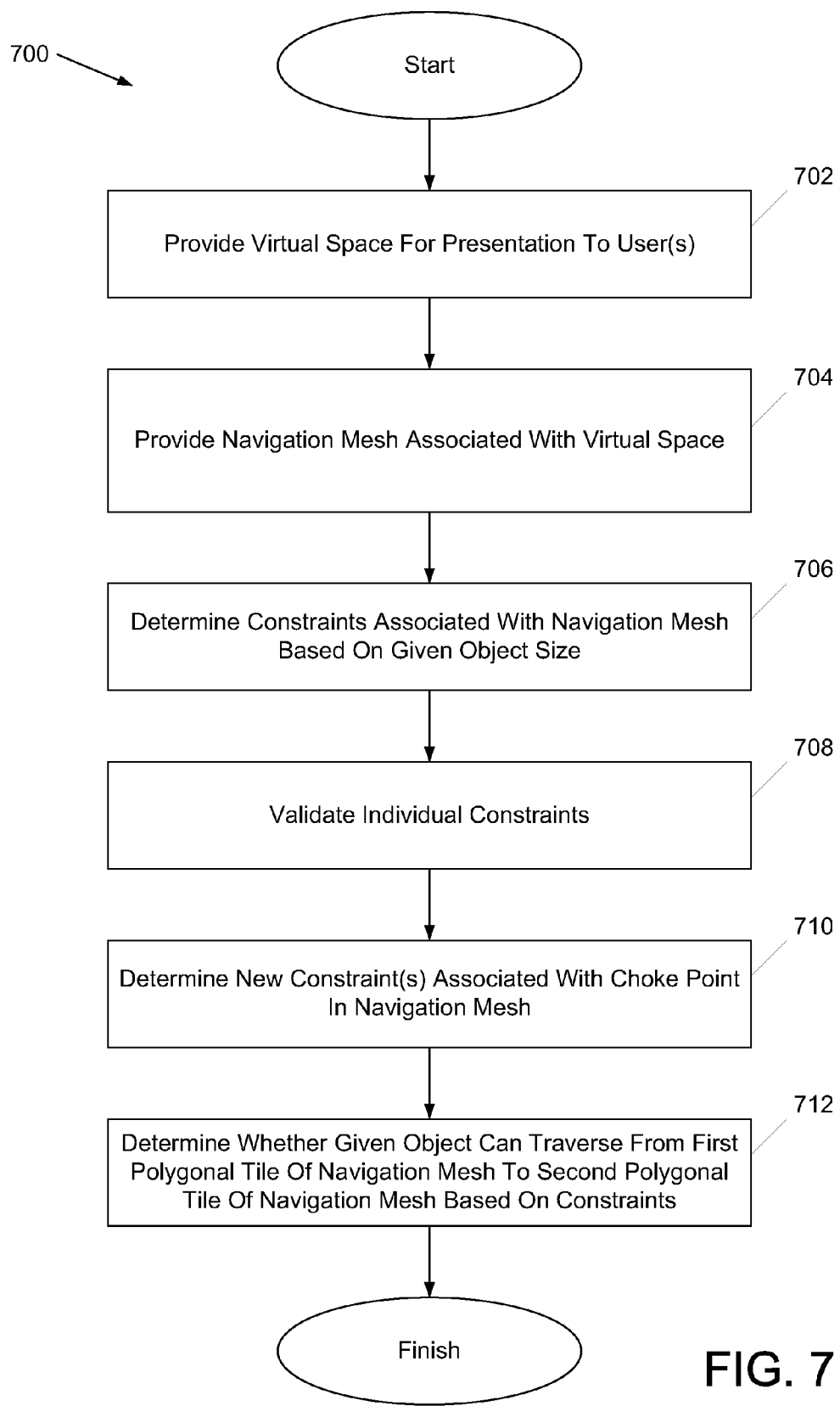
FIG. 7 illustrates a method for providing a single polygonal navigation mesh in a virtual space by which objects of varying sizes can traverse, in accordance with one or more implementations.

FIG. 7 illustrates a method 700 for providing a single polygonal navigation mesh in a virtual space by which objects of varying sizes can traverse, in accordance with one or more implementations. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At operation 702, one or more virtual spaces may be provided for presentation to one or more users. Such presentation may be performed via one or both of virtual space platform 102 and/or computing platforms 104. The space module 106 may perform operation 702, in accordance with some implementations.

At operation 704, a navigation mesh associated with the virtual space may be provided. The navigation mesh may be formed from polygonal tiles. Adjacent ones of the polygonal tiles may be joined along adjacent polygonal tile edges. Outer boundaries of the navigation mesh may confine paths by which the objects can traverse a surface or volumetric region in the virtual space such that the objects cannot breach an outer boundary of the navigation mesh. Individual ones of the objects having an object size associated therewith. The navigation mesh module 108 may perform operation 704, in accordance with some implementations.

At operation 706, constraints associated with the navigation mesh may be determined based on a given object size. The constraints may be within the outer boundaries of the navigation mesh and configured to confine a position of a center of a given object having the given object size to prevent the given object from breaching the outer boundary of the navigation mesh. The constraint initialization module 110 may perform operation 706, in accordance with some implementations.

At operation 708, individual ones of the constraints may be validated. This may include determining whether one or more constraints adjacent to a given constraint completely encompass an area of influence associated with the given constraint. Invalidated constraints may be excluded as constraints associated with a corresponding object size. The constraint validation module 112 may perform operation 708, in accordance with some implementations.

At operation 710, one or more new constraints associated with a choke point in the navigation mesh may be determined. The choke point may be a region of the navigation mesh that is narrower than adjacent regions of the navigation mesh. The split constraint module 114 may be configured to perform operation 710, in accordance with some implementations.

At operation 712, whether the given object can traverse from a first polygonal tile of the navigation mesh to a second polygonal tile of the navigation mesh may be determined based on the constraints. The mesh traversal module 116 may perform operation 712, in accordance with some implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing a single polygonal navigation mesh in a virtual space by which objects of varying size can traverse, the system comprising:
   one or more processors configured to execute computer program instructions, the computer program instructions comprising:
      a navigation mesh component configured to provide a navigation mesh associated with the virtual space, the navigation mesh formed from polygonal tiles, adjacent ones of the polygonal tiles being joined along adjacent polygonal tile edges, outer boundaries of the navigation mesh confining paths by which the objects can traverse a surface or volumetric region in the virtual space such that the objects cannot breach an outer boundary of the navigation mesh, individual ones of the objects having an object size associated therewith;
      a constraint initialization component configured to determine constraints associated with the navigation mesh based on a given object size, the constraints being within the outer boundaries of the navigation mesh and configured to confine a position of a center of a given object having the given object size to prevent the given object from breaching the outer boundary of the navigation mesh; and
      a mesh traversal component configured to determine whether the given object can traverse from a first polygonal tile of the navigation mesh to a second polygonal tile of the navigation mesh based on the constraints;
   wherein the constraints include one or both of one or more edge constraints or one or more corner constraints;
   wherein an object having two spatial dimensions in the virtual space is modeled as a circle, the circle having an object radius defining the associated object size, and wherein an object having three spatial dimensions in the virtual space is modeled as a cylinder, the cylinder having an object radius defining the associated object size; and
   wherein individual ones of the one or more edge constraints correspond to individual polygonal tile edges that form at least a portion of the outer boundary of the navigation mesh, a given edge constraint defining a line parallel to a corresponding polygonal tile edge and spaced a distance equal to the object radius associated with the given object from the corresponding polygonal tile edge.

2. The system of claim 1, wherein the computer program instructions further comprise a constraint validation component configured to validate individual ones of the constraints by determining whether one or more constraints adjacent to a given constraint completely encompass an area of influence associated with the given constraint, invalidated constraints being excluded as constraints associated with a corresponding object size.

3. The system of claim 1, wherein the computer program instructions further comprise a split constraint component configured to determine one or more new constraints associated with a choke point in the navigation mesh, the choke point being a region of the navigation mesh that is narrower than adjacent regions of the navigation mesh.

4. The system of claim 3, wherein individual ones of the one or more new constraints are portions of one or more preexisting constraints.

5. The system of claim 3, wherein the split constraint component is further configured to determine a largest object size that can traverse through the choke point.

6. The system of claim 1, wherein determining whether the given object can traverse from a first polygonal tile of the navigation mesh to a second polygonal tile of the navigation includes determining whether there are any valid positions for the given object in the second polygonal tile.

7. A system configured for providing a single polygonal navigation mesh in a virtual space by which objects of varying size can traverse, the system comprising:
   one or more processors configured to execute computer program instructions, the computer program instructions comprising:
      a navigation mesh component configured to provide a navigation mesh associated with the virtual space, the navigation mesh formed from polygonal tiles, adjacent ones of the polygonal tiles being joined along adjacent polygonal tile edges, outer boundaries of the navigation mesh confining paths by which the objects can traverse a surface or volumetric region in the virtual space such that the objects cannot breach an outer boundary of the navigation mesh, individual ones of the objects having an object size associated therewith;

a constraint initialization component configured to determine constraints associated with the navigation mesh based on a given object size, the constraints being within the outer boundaries of the navigation mesh and configured to confine a position of a center of a given object having the given object size to prevent the given object from breaching the outer boundary of the navigation mesh; and a mesh traversal component configured to determine whether the given object can traverse from a first polygonal tile of the navigation mesh to a second polygonal tile of the navigation mesh based on the constraints;

wherein the constraints include one or both of one or more edge constraints or one or more corner constraints;

wherein an object having two spatial dimensions in the virtual space is modeled as a circle, the circle having an object radius defining the associated object size, and wherein an object having three spatial dimensions in the virtual space is modeled as a cylinder, the cylinder having an object radius defining the associated object size; and wherein individual ones of the one or more corner constraints correspond to individual corners of the outer boundary of the navigation mesh having an internal angle greater than 180 degrees, a given corner constraint defining an arc centered at a corresponding corner and having a corner constraint radius equal to the object radius associated with the given object.

8. A method for providing a single polygonal navigation mesh in a virtual space by which objects of varying size can traverse, the method being performed by one or more processors configured to execute computer program instructions, the method comprising:

using one or more processors to provide providing a navigation mesh associated with the virtual space, the navigation mesh formed from polygonal tiles, adjacent ones of the polygonal tiles being joined along adjacent polygonal tile edges, outer boundaries of the navigation mesh confining paths by which the objects can traverse a surface or volumetric region in the virtual space such that the objects cannot breach an outer boundary of the navigation mesh, individual ones of the objects having an object size associated therewith;

using one or more processors to determine constraints associated with the navigation mesh based on a given object size, the constraints being within the outer boundaries of the navigation mesh and configured to confine a position of a center of a given object having the given object size to prevent the given object from breaching the outer boundary of the navigation mesh; and using one or more processors to determine whether the given object can traverse from a first polygonal tile of the navigation mesh to a second polygonal tile of the navigation mesh based on the constraints;

wherein the constraints include one or both of one or more edge constraints or one or more corner constraints;

wherein an object having two spatial dimensions in the virtual space is modeled as a circle, the circle having an object radius defining the associated object size, and wherein an object having three spatial dimensions in the virtual space is modeled as a cylinder, the cylinder having an object radius defining the associated object size; and wherein individual ones of the one or more edge constraints correspond to individual polygonal tile edges that form at least a portion of the outer boundary of the navigation mesh, a given edge constraint defining a line parallel to a corresponding polygonal tile edge and spaced a distance equal to the object radius associated with the given object from the corresponding polygonal tile edge.

9. The method of claim 8, further comprising validating individual ones of the constraints by determining whether one or more constraints adjacent to a given constraint completely encompass an area of influence associated with the given constraint, invalidated constraints being excluded as constraints associated with a corresponding object size.

10. The method of claim 8, further comprising determining one or more new constraints associated with a choke point in the navigation mesh, the choke point being a region of the navigation mesh that is narrower than adjacent regions of the navigation mesh.

11. The method of claim 10, wherein individual ones of the one or more new constraints are portions of one or more preexisting constraints.

12. The method of claim 10, further comprising determining a largest object size that can traverse through the choke point.

13. The method of claim 8, wherein determining whether the given object can traverse from a first polygonal tile of the navigation mesh to a second polygonal tile of the navigation includes determining whether there are any valid positions for the given object in the second polygonal tile.

14. A method for providing a single polygonal navigation mesh in a virtual space by which objects of varying size can traverse, the method being performed by one or more processors configured to execute computer program instructions, the method comprising:

using one or more processors to provide providing a navigation mesh associated with the virtual space, the navigation mesh formed from polygonal tiles, adjacent ones of the polygonal tiles being joined along adjacent polygonal tile edges, outer boundaries of the navigation mesh confining paths by which the objects can traverse a surface or volumetric region in the virtual space such that the objects cannot breach an outer boundary of the navigation mesh, individual ones of the objects having an object size associated therewith;

using one or more processors to determine constraints associated with the navigation mesh based on a given object size, the constraints being within the outer boundaries of the navigation mesh and configured to confine a position of a center of a given object having the given object size to prevent the given object from breaching the outer boundary of the navigation mesh; and using one or more processors to determine whether the given object can traverse from a first polygonal tile of the navigation mesh to a second polygonal tile of the navigation mesh based on the constraints;

wherein the constraints include one or both of one or more edge constraints or one or more corner constraints;

wherein an object having two spatial dimensions in the virtual space is modeled as a circle, the circle having an object radius defining the associated object size, and wherein an object having three spatial dimensions in the virtual space is modeled as a cylinder, the cylinder having an object radius defining the associated object size; and wherein individual ones of the one or more corner constraints correspond to individual corners of the outer boundary of the navigation mesh having an internal angle greater than 180 degrees, a given corner constraint defining an arc centered at a corresponding corner and having a corner constraint radius equal to the object radius associated with the given object.

* * * * *